Sept. 24, 1935.     W. R. BELDAM     2,015,467
FILTERING OR STRAINING APPARATUS
Filed Feb. 23, 1933     6 Sheets-Sheet 1
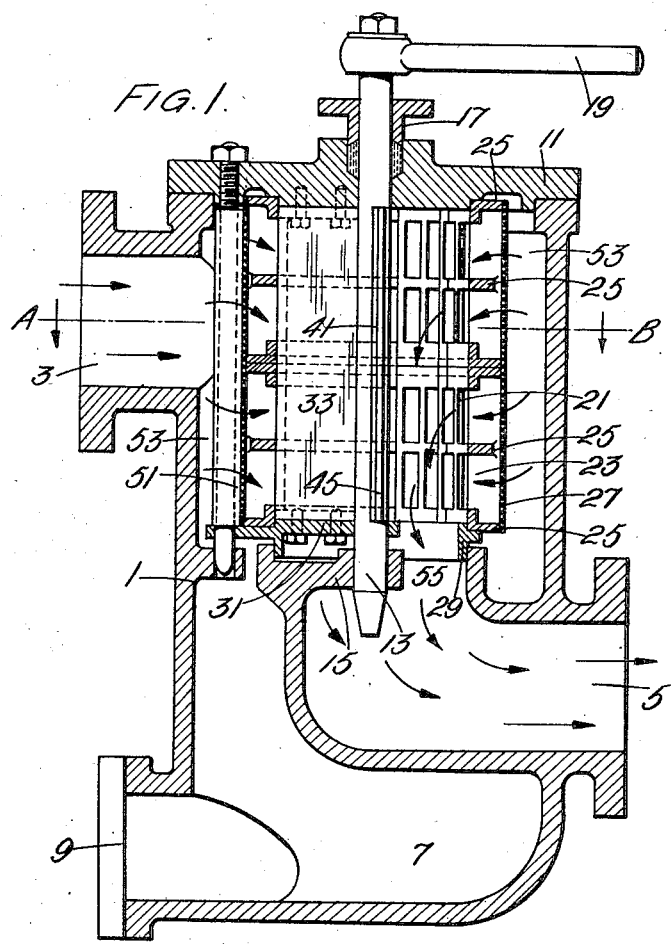
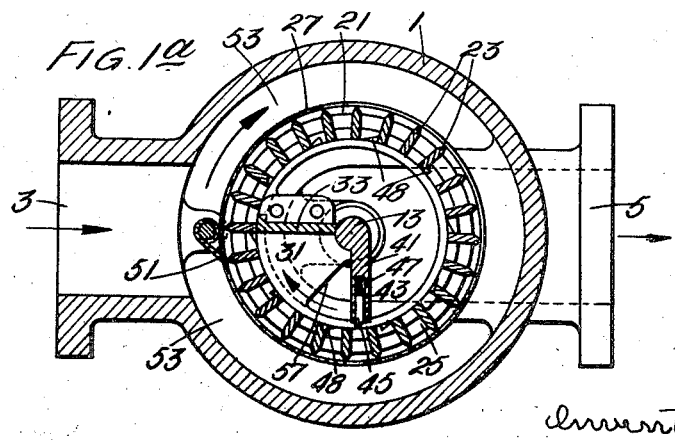
Inventor —
William R. Beldam
by
Hubert E. Peck, atty

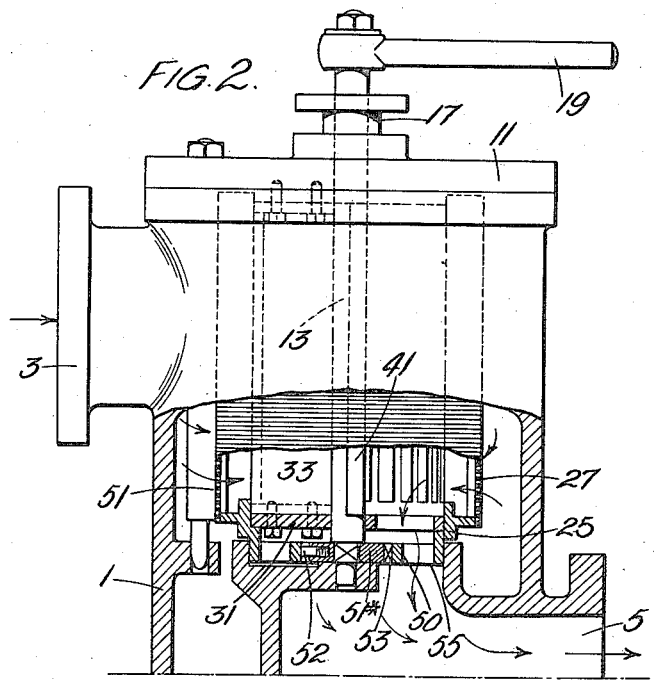
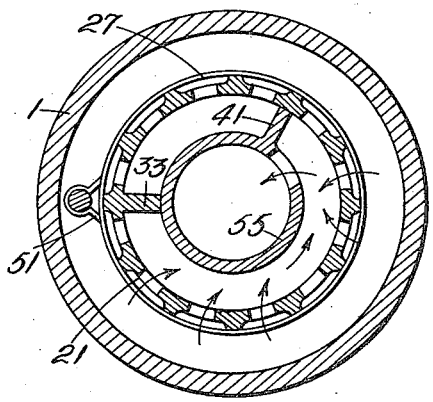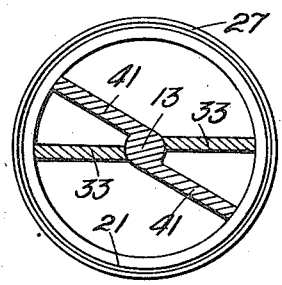

Inventor:—
William R. Beldam
by Hubert E. Peck atty

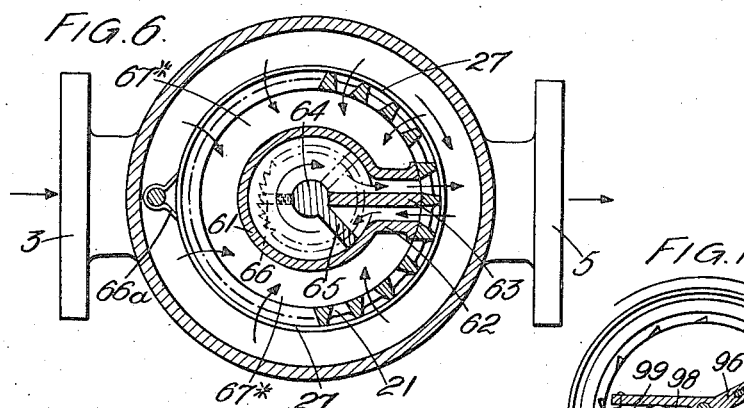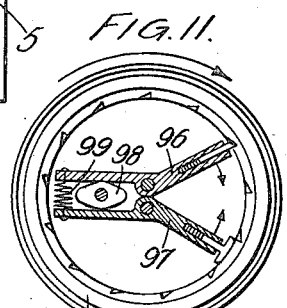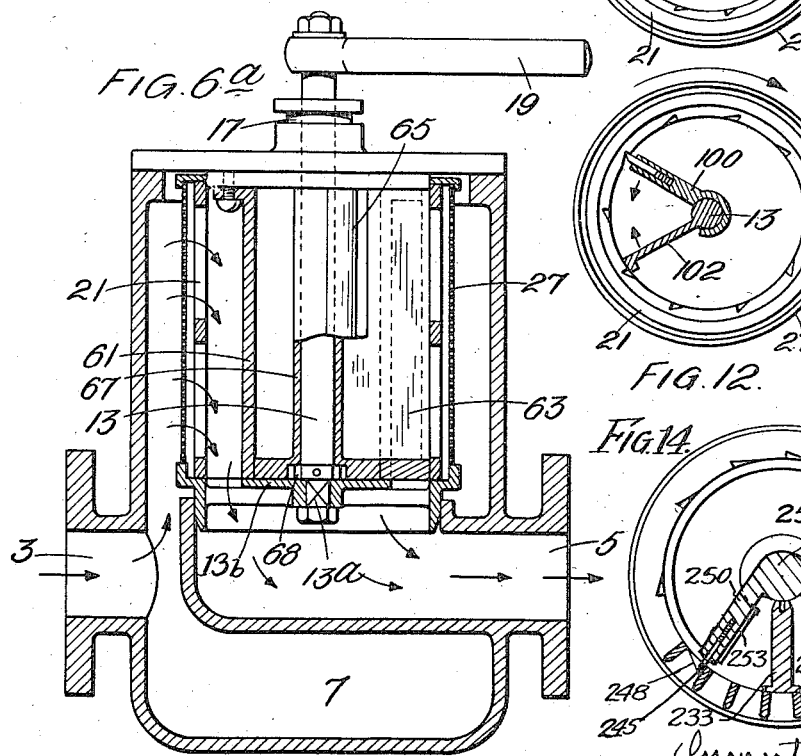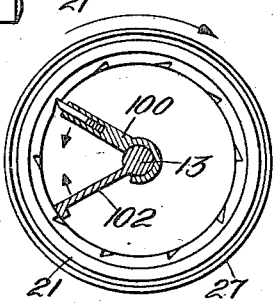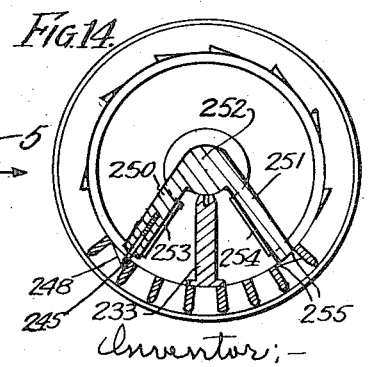

Sept. 24, 1935.  W. R. BELDAM  2,015,467
FILTERING OR STRAINING APPARATUS
Filed Feb. 23, 1933   6 Sheets-Sheet 5
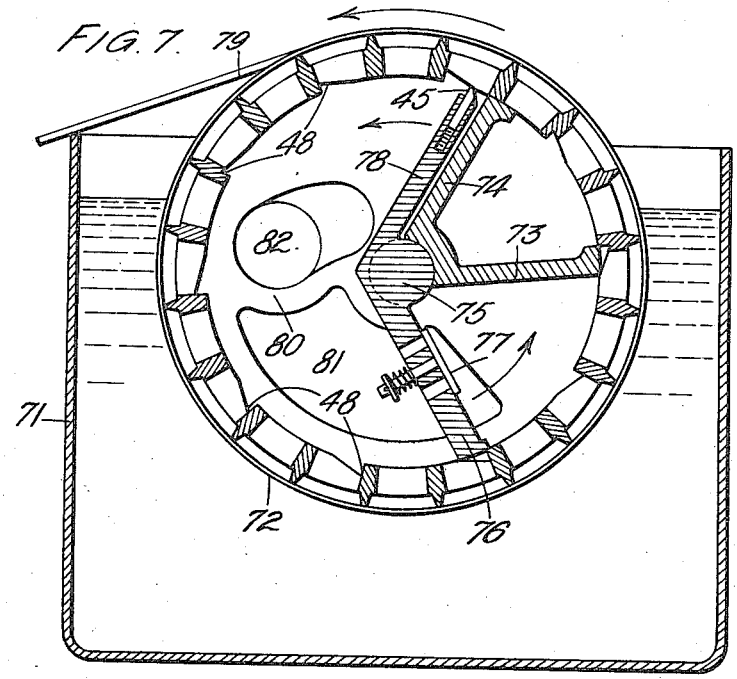
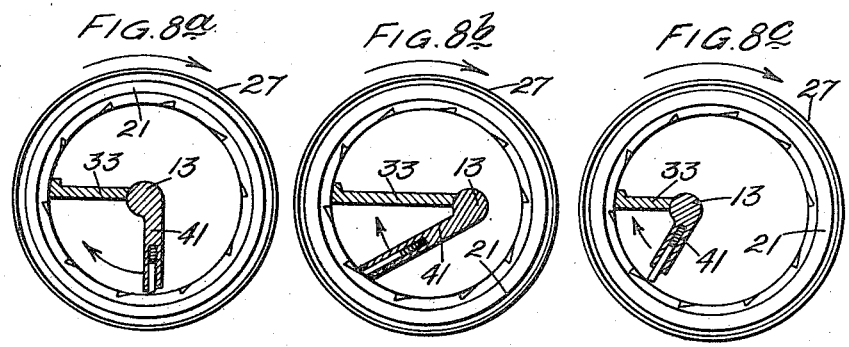
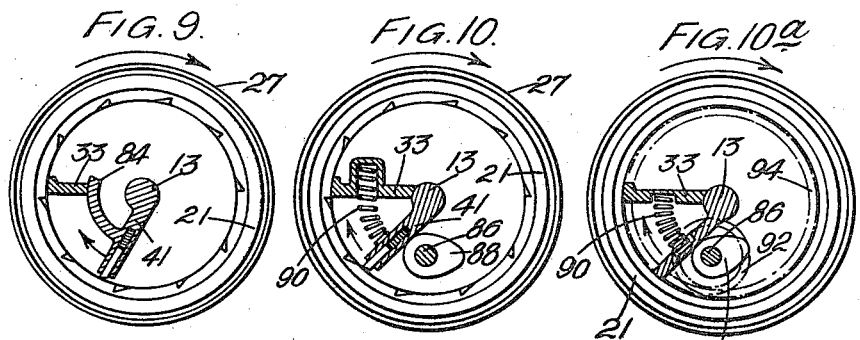

Sept. 24, 1935.  W. R. BELDAM  2,015,467
FILTERING OR STRAINING APPARATUS
Filed Feb. 23, 1933   6 Sheets-Sheet 6

Inventor:—
William R. Beldam
by Hubert E. Peck atty

Patented Sept. 24, 1935

2,015,467

UNITED STATES PATENT OFFICE 2,015,467

FILTERING OR STRAINING APPARATUS

William Robert Beldam, London, England

Application February 23, 1933, Serial No. 658,173
In Great Britain March 2, 1932

11 Claims. (Cl. 210—167)

The present invention conserns improvements in or relating to filtering or straining apparatus of the kind (hereinafter referred to as the kind specified) which uses screens comprising gauze, fabric, edges of plates, spiralled wire, or other straining media of a like nature (hereinafter referred to generically as gauze) and in which there is incorporated a pump whereby cleaning may be effected by reverse flow of cleaned fluid through the gauze without interrupting the flow of cleaned fluid through the apparatus; the invention will be illustratively described hereinafter in connection with various constructions.

It is desirable that the arrangement of the straining apparatus should be such that the said apparatus should be capable of as great a reverse flow capacity as possible, should be compact, should with a single pump be capable of use with either a single straining cartridge or with a plurality of straining catridges, should be capable of providing for scraping off the deposit at the time it is being loosened by the reverse flow, should be such that the cleaning fluid is not carried to waste but is returned to the main flow after it has effected the cleaning, and should have a pump vane of simple construction which is stationary relatively to the straining wall during the cleaning period.

It is also desirable that the apparatus should be little liable to get out of order, should be adapted for automatic operation, should be capable of operation for long periods without attention, and should be simple and economical to manufacture in a large range of sizes.

It is an object of the invention to provide an arrangement meeting the above requirements and in particular to provide an arrangement having the characteristics that a pump of the oscillatory vane type is employed, that said pump is positioned within the straining chamber itself, that it is positioned co-axially with the straining chamber so as to have a large reverse flow capacity, that scraping is effected at the reverse flow location during the reverse flow, and that the whole of the interior of the straining means may normally be a single section.

It is a primary characteristic of the invention that, by using in accordance with the invention arrangements which employ a vane type pump which is within the straining chamber and although arranged co-axially thereof has a large capacity, there become available simple forms of mechanism eminently suited for embodiment in apparatus for various purposes and for comparatively cheap production.

The various objects and the several features of the invention will become more fully apparent to those skilled in the art from the following description, in conjunction with the accompanying diagrammatic drawings, of various illustrative constructions.

In the drawings,

Fig. 1 is a vertical section of one illustrative strainer;

Fig. 1a is a sectional plan view on the line A—B of the strainer shown in Fig. 1;

Fig. 2 shows a construction with the ratchet outside the straining chamber;

Fig. 4 shows a construction in which the spindle of the first construction is replaced by a tube;

Fig. 5 is a diagram indicating a double-acting pump;

Fig. 6 is a cross section showing a construction with an interior pump barrel having a divided discharge;

Fig. 6a shows a construction similar to Fig. 6 except that the straining cage is oscillatory instead of rotary;

Fig. 7 shows a construction for straining fruit pulp;

Figure 13:
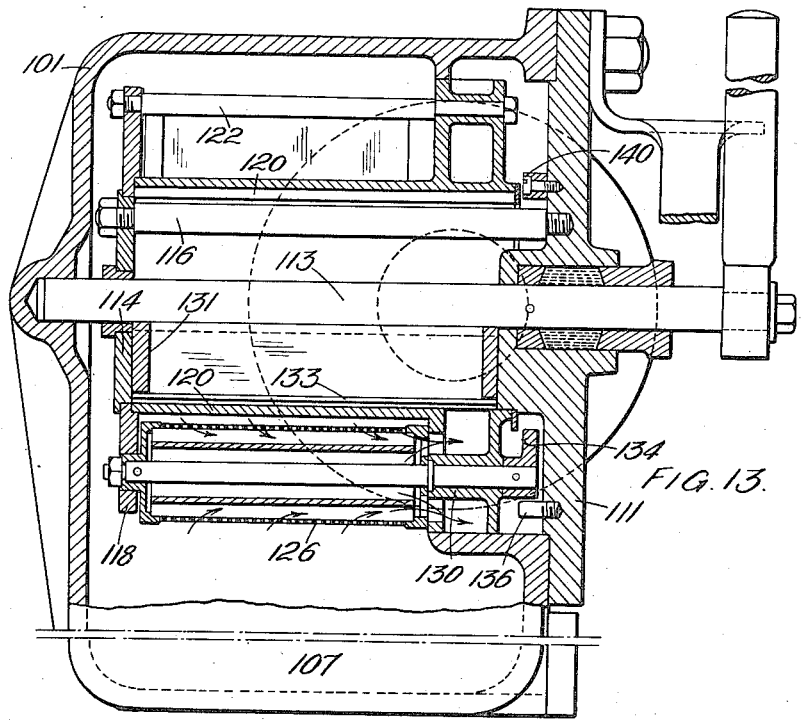
Figure 13A:
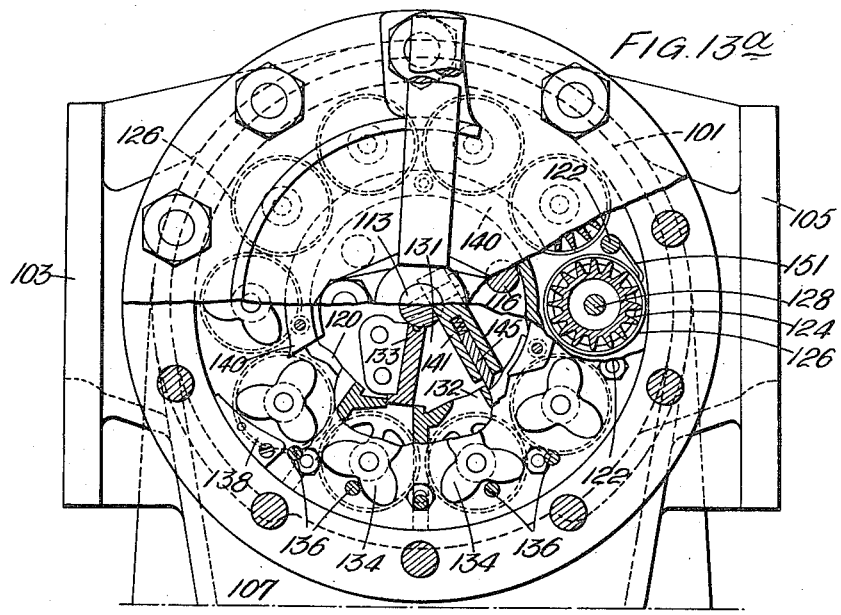

Figs. 8a, 8b, and 8c are diagrams indicating the construction of Fig. 1 and two variations thereof;

Fig. 9 is a diagram indicating a pump vane with a stabilizing arm;

Figs. 10 and 10a are diagrams indicating a pump vane operated from a continuously-rotating shaft;

Fig. 11 is a diagram indicating a construction in which the pump vane and division wall are both movable;

Fig. 12 is a diagram indicating another construction in which the pump vane and the division wall are both movable; and Figs. 13, 13a, and 14 show further modifications of the invention.

The illustrative construction first to be described comprises a casing 1 with an inlet 3 and an outlet 5; in the base of the casing there is a sump 7 with a sump door 9; the casing or chamber 1 has a removable cover 11. A spindle 13 has its lower end mounted in a bracket 15 and its upper end mounted in a gland 17 in the cover 11. The upper end of the spindle 13 is provided with a lever 19 which may be hand-operated or may be connected to mechanism for automatic operation. Mounted upon the spindle 13 for rotation thereon is a cage (indicated generally at 21) in the nature of a squirrel cage, the axis of the cage being concentric with the axis of the spindle 13. The cage comprises a number of vertical bars 23 which are held together by rings, as 25. Encircling the vertical bars 23 is gauze, indicated at 27. The top and bottom rings 25 make an oil-tight joint respectively with the cover 11 and with an annular cage base 29 which latter is fixed to the casing 1.

The lower end of the cage is open (see Fig. 1a) except for one portion (about 45°) which is closed by means of a blanking plate 31 which forms part of the cage base 29 and so is fixed to the casing. This blanking plate 31 carries a fixed vertical division wall 33 which extends upwardly to the cover 11; the said wall has its outer edge in contact with the vertical bars 23 and at its inner end contacts with the spindle 13 so that a complete vertical division wall is formed within the cage between its outer internal periphery and the adjacent periphery of the spindle.

The spindle 13 has fixed to it a pump vane 41 (Fig. 1a) which moves with the spindle and which extends from the spindle radially, along the whole height of the cage, to the bars 23. Along the whole length of the free margin of the vane 41 is a radial slot 43 in which is located a plate 45 which is pressed outwardly (radially) by a spring 47 located between the bottom of the slot and the inner margin of the plate. The outer margin of the plate is shaped as a ratchet pawl. Thus the plate 45 forms an adjustable end to the vane. The interior of the cage is formed with ratchet teeth as 48 which are cut in the bands 25.

Mounted in the casing outside the straining cage and opposite the blanking plate (see Fig. 1a) is a spring scraper 51 which contacts with the outside of the gauze 27 as the straining cage rotates. Any material displaced by the scraper falls downwardly into the sump 7.

The operation is as follows:—Normally the spindle 13 is so positioned that the movable vane 41 is located in a position not above the blanking plate 31, so that it is inoperative to divide the interior or pump barrel into separate sections. Oil passes through the inlet 3 into the space 53 surrounding the cage and then inwardly through the gauze into the interior of the straining cage. From there it passes downwardly (without interference by the pump vane 41) through the bottom end of the straining cage into the duct 55 leading to the outlet 5. When it is desired to clean the gauze the spindle 13 is turned in a clockwise direction (Fig. 1a) and carries with it the pump vane 41 and (through the pawl 45) the straining cage. When the pump vane 41 overlaps the edge 57 of the blanking plate the oil in about ⅛th of the cage is trapped between the blanking plate at the bottom, the cover 11 at the top, the pump vane 41, and the division wall 33. On further movement of the pump vane 41 in a clockwise direction, the trapped oil is forced outwardly through the adjacent gauze which is thereby cleaned. The displaced or loosened dirt, if it remains attached to the outside of the gauze, is removed therefrom by the scraper 51 as the gauze rotates past the latter.

During the cleaning operation the rest of the filter is operating normally and discharging to its outlet.

On reverse movement of the spindle the pump vane 41 moves in a counterclockwise direction, the pawl 45 slipping over the interior of the straining cage, the latter remaining stationary by reason of friction between the cage and its supports.

The movable plate pawl 45 has the advantage that it provides for a tight joint between the pump vane and the interior of the cage even after wear has taken place; during pumping the pump vane is stationary relatively to the pump barrel.

If desired means may be provided to check reverse movement of the cage during reverse movement of the pump vane but it is believed that in a large number of cases this will not be necessary.

If desired, instead of combining the pump vane with a ratchet pawl to engage with the wall of the straining chamber, a ratchet and pawl might be mounted outside the straining chamber; for example, a ratchet wheel might be fixed to the bottom of the straining chamber, and a spring-pressed pawl might be carried by a collar fixed to the spindle. Fig. 2 shows such a construction, the bottom ring 25 being formed as a spider with its boss 50 encircling a collar 51* and pawl 52 and having internal teeth 53 to be engaged by the pawl. The operation in this case is similar to that already described.

Figure 3:
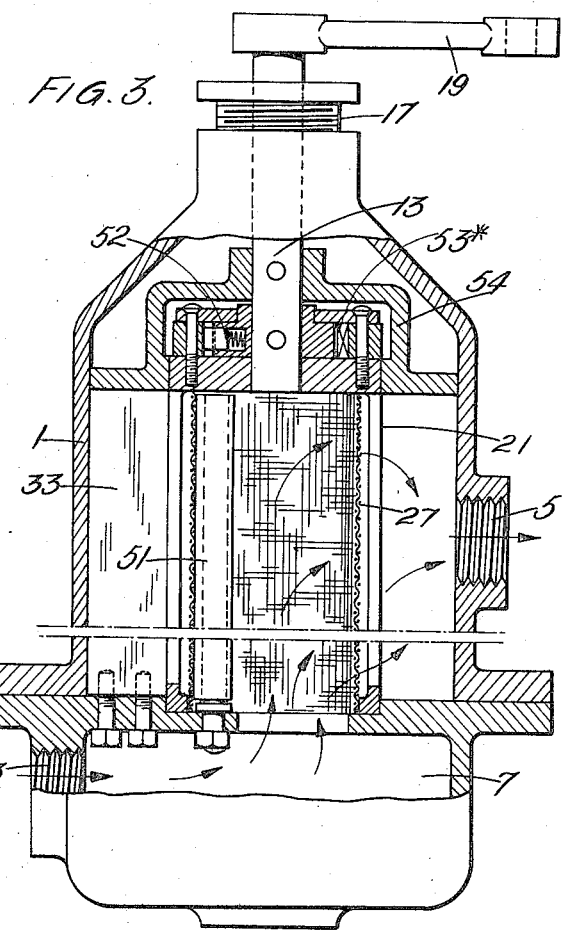
Figs. 3 and 3a show a construction in which the flow of oil is from inside to outside of the straining chamber.
Figure 3A:
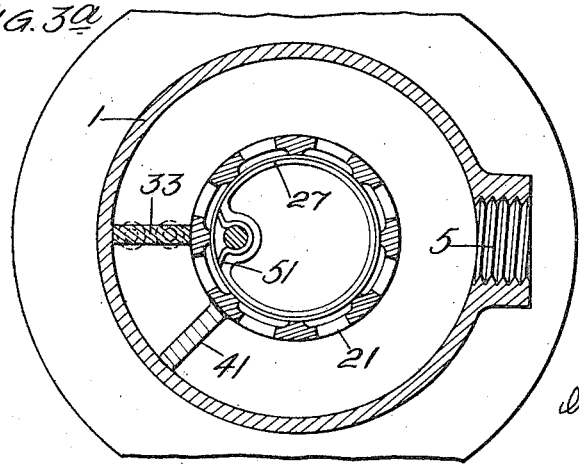

In an alternative construction the flow of oil is from the inside to the outside of the strainer 21; consequently the gauze 27 (see Figs. 3 and 3a) is on the inside of the cage, as is the scraper, and the movable vane 41 and the division wall 33 are between the outside of the straining cage and the interior-wall of the casing. The movable vane depends from a cap 54 fixed to the spindle above the straining chamber. The straining chamber is connected to the spindle by a ratchet pawl and ratchet wheel 52, 53 respectively.

In another alternative construction (see Fig. 4) the spindle of the first construction is replaced by a tube 55. The movable vane 41 is carried by the exterior of the tube; the division wall 33 is carried by the interior of the straining cage and is movable therewith instead of being fixed to the blanking plate. The movable vane is moved counterclockwise until it strikes the division wall and during this time cleaning by reverse flow takes place the straining cage being held by friction or otherwise. The vane is moved further in the same direction and carries the division wall and the straining cage with it; during this part of the movement there is no reverse flow cleaning but there is scraping. The vane is then moved clockwise till it strikes the other side of the division wall. It may then be moved again counterclockwise. The cage, the division wall and the vane have the same axis of movement.

If desired, the strainer 21 might be made double-acting by providing (as indicated in the diagram Fig. 5) the spindle with two diametrically opposite vanes 41 and by providing a corresponding division wall 33 to co-act with each of these spindle vanes; thus the straining cage is divided into two sections with a pump vane operating in each.

Another construction is as follows:—The strainer (see Fig. 6) comprises a vertical tubular cage 21 covered with gauze 27. Inside the cage 21 and spaced therefrom is a fixed tube 61 which is cylindrical and is co-axial with the straining cage, except that it has at one side a spout 62 which extends longitudinally of the straining cage and turns outwardly to make a running joint with the interior of the straining cage 21. A fixed vertical division wall 63 divides the tube; its outer end has a running joint with the interior of the straining cage midway between the sides of the spout 62, and its inner end has a running joint with a spindle 64 which is co-axial with the straining cage and the tube. This spindle 64 carries a vane 65 which extends radially to the interior wall of the tube 61 and makes a running joint therewith. The spindle 64 is also connected through a ratchet 66 to the cage. On the outside of the cage is a scraper 66a extending longitudinally of the straining cage. Fluid to be strained flows inwardly through the straining cage 21 into the annular space 67* and out in an endwise direction as in Fig. 1; the flow through the cage opposite the aforementioned spout, however, is separated from the main cleaned fluid and flows into the interior of the tube 61, the blanking plate closing the bottom of the spout 62 and tube 61. When the spindle is rotated, say in a clockwise direction, it rotates the vane 65 and so forces out oil on the upper side (in Fig. 6) of the division wall 63 through the upper half of the spout and so outwards through the adjacent portion of the straining cage; it also draws in oil through the lower side of the spout into the tube behind the moving vane. As the movable vane 65 rotates in cleaning direction so also does the straining cage, with the result that the outwardly flowing cleaned oil from within the tube 61 passes through successive portions of the straining medium as the latter rotates past the spout and so cleans it. On the return stroke of the spindle (in a counter-clockwise direction) the movable vane moves reversely and forces clean oil out through the lower half of the spout but as the straining cage is stationary only a small section of the straining media is cleaned upon the return stroke of the movable vane.

With the same general arrangement, the straining cage 27 may be made to oscillate to and fro (Fig. 6a) instead of always advancing in the same direction as in Fig. 6, a certain slight differential motion being then provided between the vane 65 and the straining cage in order that the whole of the periphery of the straining cage shall be cleaned at each stroke of the movable vane although the vane itself oscillates through somewhat (the width of the spout) less than 360°. This result can be obtained by replacing the ratchet 66 of Fig. 6 by a lost-motion device. In Fig. 6a the spindle 13 has a squared end 13a to which is fixed a ported disc 13b fixed to the lower end of the straining cage 21. The movable vane 65 is fixed to a sleeve 67 which surrounds the spindle. Fixed to the spindle is a projection 68 which engages after a certain amount of lost motion with a stop projecting from the sleeve 67. Consequently upon rocking the handle 19 through 360° in either direction, the cage 27 is also rocked through 360° but the vane 65 through 360° minus the lost motion.

As already pointed out more than one movable vane might be used. In such a case advantage may be taken of the possibility of arranging for two actions on the straining media, e. g. in addition to the reverse flow pumping action at one location there might be a suction action at another locality. Fig. 7 shows apparatus for use in straining fruit pulp, for example, apple mush in cider making. In this case a tank 71 contains a horizontal cylindrical strainer 72 which has its upper part above the level of the mush being strained. The apparatus comprises two longitudinal division walls 73 and 74. A spindle 75 carries a movable vane 76 having, if desired, a valve 77. The spindle 75 carries also an upper vane 78 having at its upper end a ratchet pawl 45 adapted to co-operate with ratchet teeth 48 upon the interior of the straining cage. As the straining cylinder 72 is rotated solid material is collected on its outer surface and is carried above the mush where it is scraped off by a scraper 79. During the cleaning of the straining media the vane 76 reverses the flow of strained fluid through the strainer and at the same time the vane 78 sucks air into the strainer through the solid matter caked on the outside of the strainer and so draws further moisture from the solid matter before it is scraped off. In this construction the blanking plate 80 extends over the whole of the end of the cylinder except the recess 81 and the aperture 82; the latter is to permit the liquid drawn in by the vane 78 to be discharged because it is not desired when the vane moves clockwise that that liquid should be again expelled. Thus the vane 78 has no cleaning effect upon the straining cage, the whole of the cleaning being effected by the vane 76.

It may sometimes be desired to obtain (for a given size of apparatus and a given pump stroke) a different (larger or smaller) reverse flow from that obtainable with apparatus as hereinbefore suggested. Such a result may be obtained by enclosing between the pump vane and the division wall a larger or smaller area than in the case of apparatus hereinbefore suggested. Fig. 8a is a diagram indicating apparatus as described with reference to Fig. 1 in which the movable vane is co-axial with the straining chamber. Figs. 8b and 8c are diagrams indicating similar apparatus but with the movable vane mounted off-centre relatively to the straining chamber. In this way the segment of the straining chamber enclosed between the pump vane and the division wall when straddling a given arc of the chamber is in Fig. 8b larger and in Fig 8c smaller than in the case of Fig. 8a, and consequently the volume of fluid expelled during cleaning is correspondingly varied. While reference has been made especially to the construction of Fig. 1 it will be appreciated that such a difference can be obtained in the case of other constructions herein described.

Fig. 9 indicates another construction by which a smaller reverse flow for a given size of straining chamber may be obtained, at the same time giving additional support to the movable pump vane. In this construction the movable vane 41 has an arm 84 which takes a bearing on a shortened division wall 33. If the movable vane 41 were pivoted off-centre as though to give a larger reverse flow as previously described and this arm 84 were added to give better stability to the pump vane then the reverse flow would need to be but little reduced.

In the constructions so far described the spindle of the pump vane has been assumed to be oscillated from a reciprocating member outside the strainer casing. If it is desired to operate the pump from a continuously-rotating element the construction indicated in Fig. 10 may be used. The pump vane 41 is mounted as in Fig. 1 but its spindle 13 is not directly operated. Instead there is provided a shaft 86 which is continuously driven from an outside source. This shaft has fixed to it a cam 88 which acts upon the pump vane to drive it (and the straining chamber) in one direction; reverse movement of the pump vane is effected by a spring 90 located between the pump vane 41 and the fixed division wall 33.

An alternative arrangement is shown in Fig. 10a. In this case the straining chamber 21 is driven, not by a pawl on the vane, but by a pinion 92 on the shaft 86 which pinion engages with an internally-toothed gear-wheel 94 fixed to the straining cylinder.

In Fig. 11 there is indicated a construction in which both the pump vane 96 and the division plate 97 are movable towards and from one another under action of a rotary cam 98 and a spring 99. The pump vane has a pawl which moves the straining chamber continuously in one direction.

In Fig. 12 there is indicated another construction in which both the pump vane 100 and the division plate 102 are movable. Cleaning is effected by moving the pump arm through 45° until it reaches the division wall and by following on, say a further 45°, it carries the division wall and the cartridge (through the pawl) round past the scraper. The pump arm is then moved back and it draws with it the division wall by means of a link or chain. A number of to-and-fro strokes of the pump arm completely rotates the cartridge.

In certain circumstances, for example where the largest possible straining capacity is desired with a minimum of weight, a plurality of straining cartridges may be used with a single pump. Such a construction is found to be extremely useful in marine work. A construction of this kind will now be described with reference to Figs. 13 and 13a. This construction is arranged with the axis of its pump horizontal, but it will be understood that a similar construction might be arranged vertically.

The casing 101 has an inlet 103 and an outlet 105. In the bottom of the casing is a sump 107. A pump spindle 113 is mounted for oscillation in the casing. A pump end-plate 114 is fixed to the casing cover 111 by means of support rods as 116. The pump end-plate carries a blanking plate 131 and a division wall 133. The pump end-plate 114 has rotatably mounted upon it a ring 118 for carrying the straining cartridges. A pump barrel 120 is fixed to the ring 118 by means of rods 122 which also carry scrapers 151. Fixed to the pump spindle 113 is a pump vane 141 which has a pawl 145 as hereinbefore described, this pawl engaging with ratchet teeth formed on the interior of the barrel 120. Thus as the pump vane is oscillated it moves the pump barrel 120, the ring 118, and the straining cartridges carried thereby round its axis with an intermittent motion.

Carried upon the ring 118 are ten straining cartridges, each comprising a support 124 wound with wire 126 and fixed to a spindle 128 which latter is mounted for rotation in the ring 118. At the right hand side of the straining cartridges (Fig. 13) is a header 130 into which oil flows from the interior of the cartridge and from which oil flows through a port 132 to the interior of the pump barrel 120, whence it flows to the outlet. The right-hand end of the cartridge spindle carries a 3-pointed star-wheel 134 which is adapted as the cartridge ring rotates to strike against pegs 136 which are fixed in the cover 111, with the result that the cartridge is rotated against its scraper 151. There are five pegs 136 so arranged that each cartridge in passing the pegs is rotated about one and ⅓ turns; in order to prevent movement of the star-wheel 134 when not under control of the pegs a cam 138 and a ramp 140 are provided.

The operation is as follows:—Oil flows into each straining cartridge through the wire 126, then endwise from the cartridge to the right in Fig. 13 into the header 130, thence through the port 132 into the interior of the barrel 120 and thence through the right-hand end of the barrel (in Fig. 13) to the outlet. When cleaning is to be effected the spindle 113 is moved in a clockwise direction so that the vane 141 overlaps the blanking plate 131 and approaches the division wall 133, with the result that the oil trapped between the division wall and the vane is forced outwardly through the port 132 and back into the interior of the straining cartridge and out through the wire 126. During this movement the vane 141 by means of the pawl 145 rotates the pump barrel 120 and so carries another straining cartridge into the position in which it may be cleaned and at the same time causes through the star-wheels 134 certain of the cartridges to be rotated for scraping.

Referring to Fig. 14, 233 indicates a division wall extending the length of the casing. A pair of movable vanes 250, 251 is carried on a spindle 252 running centrally through the casing so that the vane 250 is on one side and the vane 251 on the opposite side of the fixed vane 233. The normal position is as shown in the drawings in which the vanes 250 and 251 are spaced from the fixed vane 233 so that there is a port 253, a port 254 and ports 255 through which strained fluid can leave the chambers formed between the fixed and movable vanes. In the vane 250 is a spring-pressed plate 245 which engages ratchet teeth 248 by which the cage is locked to the movable vanes when the latter are rotated in an anti-clockwise direction, but which will permit the movable vanes to be rotated in a clockwise direction free of the cage.

The action is as follows:—When it is desired to remove the accumulated sludge from the surface of the straining cylinder movement of the spindle 252 in an anti-clockwise direction moves the vane 250 towards the fixed vane 233 at the same time carrying with it the cage. The fluid between the vane 250 and the vane 233 is thereby forced outwards through the straining wall while all of the remaining portion of the straining wall is available for normal flow of fluid. When this operation has been completed the movable vanes are moved in the opposite direction to a position in which the vane 251 is adjacent the fixed vane 233, the straining wall remaining stationary. After this the movable vanes are usually returned to the normal position shown in the drawings though it will be understood that the strainer may be operated with the vane 251 close to the fixed vane 233.

The portion of the straining wall between the vanes 250 and 251 is opposite to the sump in which the sludge is collected and after the first movement of the vane 250 towards the vane 233 the removed sludge will be suspended to a certain extent in the liquid in contact with the straining wall. Movement of the vane 251 up to the fixed vane 233 causes the liquid between these vanes to be forced outwards through the straining wall thereby preventing such suspended matter from being collected onto the straining wall.

If desired the casing may be rotated by an external ratchet or other means.

What I claim is:—

1. Fluid filtering or straining apparatus of the kind specified, comprising a straining chamber, a straining medium within said chamber through which medium the fluid normally flows in one direction, and a pump of the oscillatory vane type disposed within said chamber for pumping fluid through said straining medium in the reverse direction and consisting of a vane oscillatable in relation to a second vane.

2. Fluid filtering or straining apparatus of the kind specified, comprising a straining chamber, a cylindrical straining medium within said chamber through which medium the fluid normally flows in one direction, and a pump of the oscillatory vane type disposed within said chamber for pumping fluid through said straining medium in the reverse direction and consisting of a vane oscillatable about an axis concentric with said straining medium in relation to a second vane.

3. Fluid filtering or straining apparatus of the kind specified, comprising a straining chamber, a straining medium within said chamber through which medium the fluid normally flows in one direction, a pump of the oscillatory vane type disposed within said chamber for pumping fluid through said straining medium in the reverse direction and consisting of a vane oscillatable in relation to a second vane, and means for moving said straining medium with said oscillatable vane in such manner that there is no relative movement between them during the pumping of the fluid reversely through said medium.

4. Fluid filtering or straining apparatus of the kind specified, comprising a straining chamber, a straining medium within said chamber through which medium the fluid normally flows in one direction, and a pump consisting of an arcuate barrel bounded in part by said straining medium, a cover closing one end of said barrel, a blanking plate closing a part of the other end of said barrel, a partition wall extending longitudinally of said barrel and making fluid tight contact with the cover and blanking plate, and a vane oscillatable towards the partition wall to trap fluid between said cover, blanking plate and partition wall and thereby to force the trapped fluid through said straining medium in the reverse direction.

5. Fluid filtering or straining apparatus of the kind specified, comprising a straining chamber, a straining medium rotatably mounted within said chamber through which medium the fluid normally flows in one direction, a pump of the oscillatory vane type disposed within said chamber for pumping fluid through said straining medium in the reverse direction and consisting of a vane oscillatable in relation to a second vane, a ratchet pawl associated with the oscillatory vane, and ratchet teeth associated with the straining medium and engageable by said pawl for intermittently rotating said medium as said vane is oscillated for pumping the fluid reversely therethrough.

6. Fluid filtering or straining apparatus of the kind specified, comprising a straining chamber, a straining medium within said chamber through which medium the fluid normally flows in one direction, a pump of the oscillatory vane type disposed within said chamber for pumping fluid through said straining medium in the reverse direction and consisting of a vane oscillatable in relation to a second vane, a scraper engaging the straining medium, and means for producing relative movement between said scraper and straining medium during the reverse pumping of fluid through the latter.

7. Fluid filtering or straining apparatus of the kind specified, comprising a cylindrical straining cage through which the liquid normally flows inwardly, and a pump consisting of a cover closing a part at least of one end of the straining cage, a blanking plate closing a part of the other end of said cage, a partition wall extending from the axis of the cage to the cage itself and making fluid tight contact with the cover and blanking plate, and a vane oscillatable about the axis of the cage towards the partition wall to trap fluid between said cover, blanking plate and wall and thereby to force the liquid outwardly through the straining medium.

8. Fluid filtering or straining apparatus of the kind specified, comprising a cylindrical straining cage through which the fluid normally flows inwardly, a tubular member disposed within said cage, a spout projecting outwardly from said tubular member into contact with said cage, a partition wall extending from the axis of said tubular member into said spout and dividing the latter, and a pump vane oscillatable within the tubular member for pumping fluid into the spout and outwardly through the straining cage.

9. Fluid filtering or straining apparatus of the kind specified, comprising a straining chamber containing fluid to be strained, a straining cage partially immersed within said fluid which normally flows inwardly through said cage, a partition extending radially within said cage, a pump vane movable towards said partition below the level of the fluid in the straining chamber for forcing fluid outwardly through a part of said cage, a second pump vane movable away from said partition above said fluid level for drawing air inwardly through a part of said cage, means for oscillating said vanes, and means associated with said vanes for intermittently rotating said cage.

10. Fluid filtering or straining apparatus of the kind specified, comprising a straining chamber, a plurality of straining cartridges which are arranged circularly within said chamber and through which the fluid normally flows in one direction, a single pump of the oscillatory vane type disposed concentrically with said cartridges within said chamber, a series of ducts each associated with a cartridge, and means for rotating said plurality of cartridges bodily to bring said ducts successively into communication with said pump for the forcing of fluid by way of said ducts reversely through said cartridges.

11. Fluid filtering or straining apparatus of the kind specified, comprising a straining chamber, a plurality of straining cartridges which are arranged circularly within said chamber and through which the fluid normally flows in one direction, a single pump of the oscillatory vane type disposed concentrically with said cartridges within said chamber, a series of ducts each associated with a cartridge, means for rotating said plurality of cartridges bodily to bring said ducts successively into communication with said pump for the forcing of fluid by way of said ducts reversely through said cartridges, scrapers engaging the surfaces of said cartridges, and means for rotating one at least of said cartridges at a time about its own axis.

WILLIAM ROBERT BELDAM.